C. W. BOOTH.
JOURNAL BOX LID FASTENER.
APPLICATION FILED NOV. 13, 1909.
1,067,300.
Patented July 15, 1913.
2 SHEETS—SHEET 1.
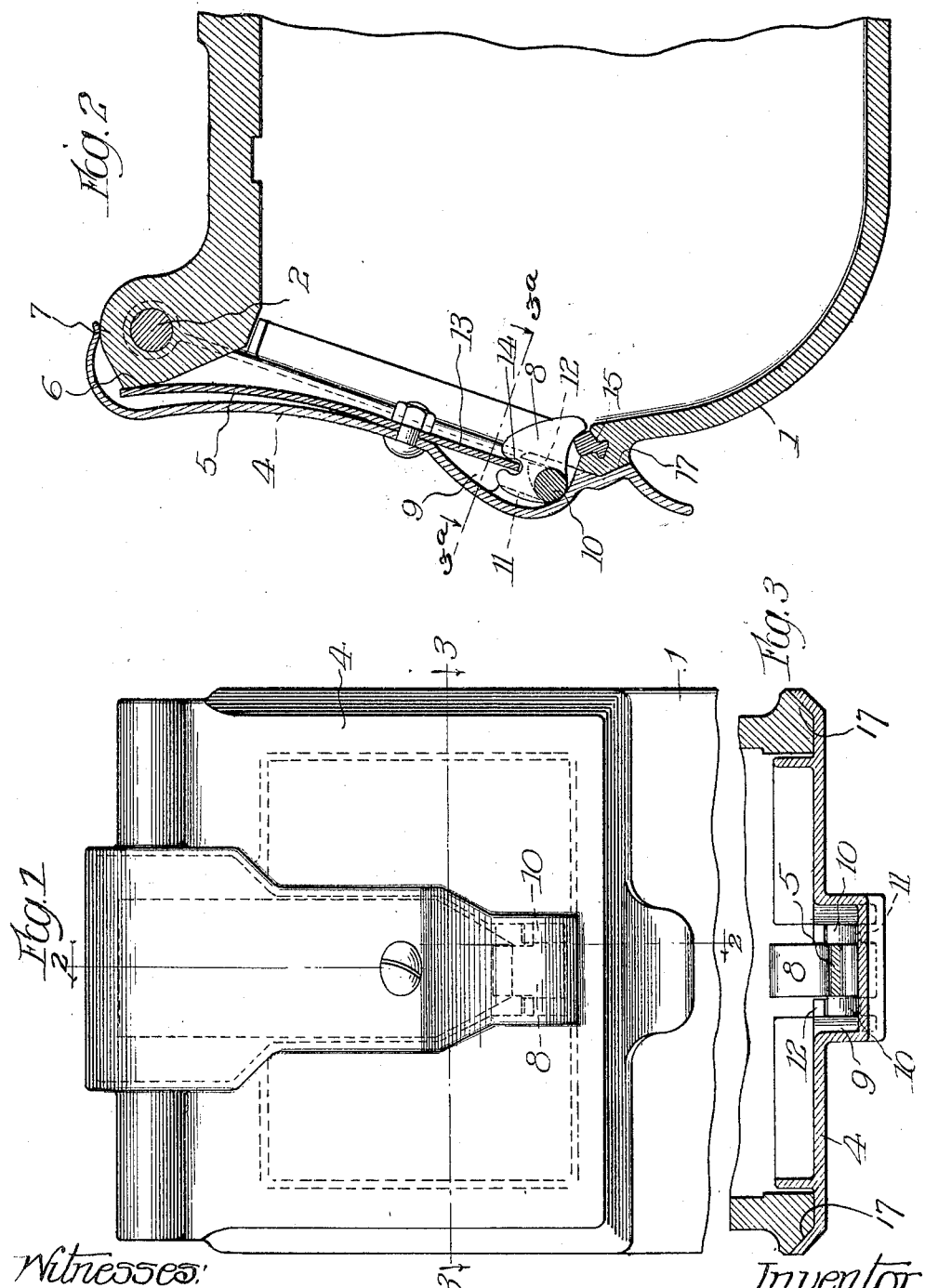
Witnesses:
K. A. Costello.
Harold G. Barrett
Inventor:
Charles W. Booth C. W. BOOTH.
JOURNAL BOX LID FASTENER.
APPLICATION FILED NOV. 13, 1909.
1,067,300.
Patented July 15, 1913.
2 SHEETS—SHEET 2.
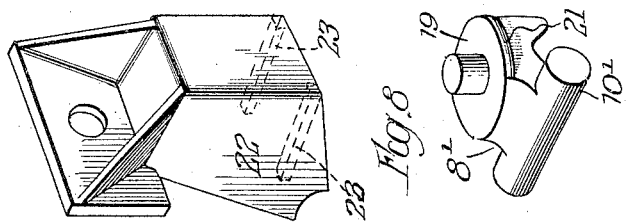
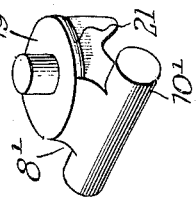
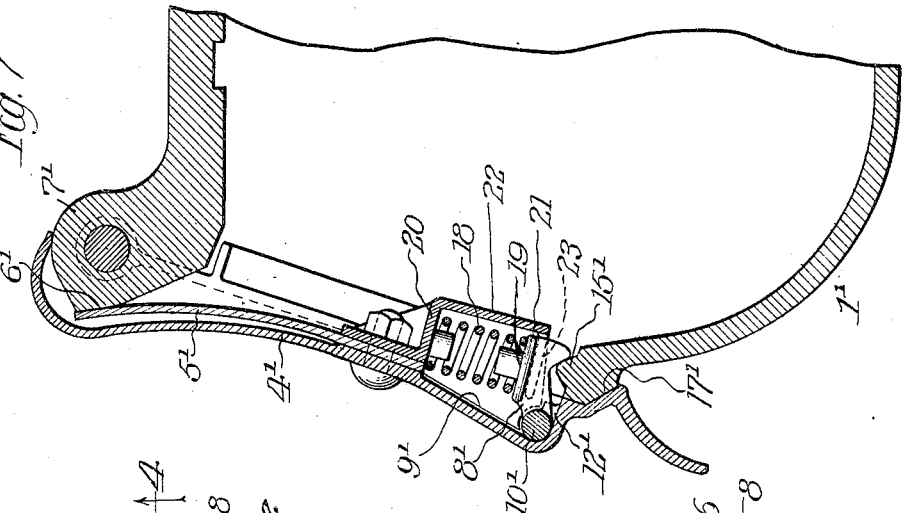
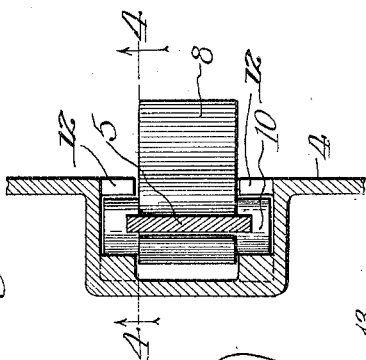
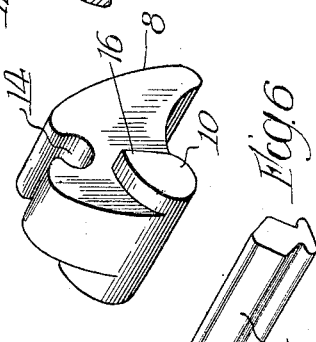
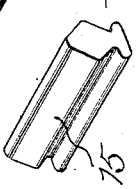
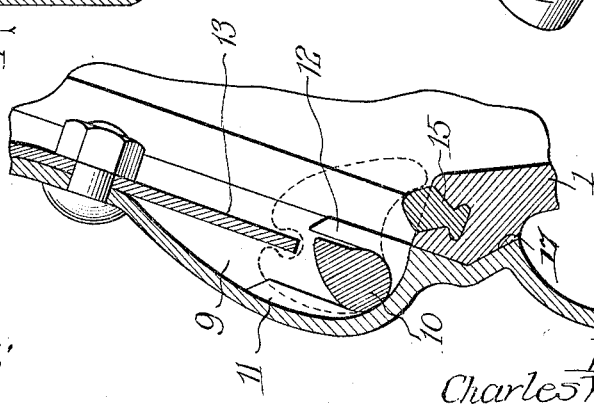
Witnesses:
K. A. Costello
Harold G. Barrett
Inventor:
Charles W. Booth
by Geo. E. Waldo
Atty.

UNITED STATES PATENT OFFICE.

CHARLES W. BOOTH, OF CHICAGO, ILLINOIS.

JOURNAL-BOX-LID FASTENER.

1,067,300.   Specification of Letters Patent.   Patented July 15, 1913.

Application filed November 13, 1909. Serial No. 527,778.

*To all whom it may concern:*

Be it known that I, CHARLES W. BOOTH, a citizen of the United States, and a resident of Chicago, in the county of Cook and State of Illinois, have invented certain new and useful Improvements in Journal-Box-Lid Fasteners, of which the following is a specification.

This invention relates to journal boxes and lids therefor.

Objects of the invention are to provide an improved latch or catch for securing the lids of journal boxes in closed positions, together with means coöperating therewith to centralize said lids relatively to their seats on the journal boxes proper, and to form tight, dust-proof joints between said lids and journal boxes.

To effect the objects of the invention, my improved journal box and lid comprise the various features and details of construction hereinafter described and claimed.

In the accompanying drawings, in which my invention is fully illustrated,—Figure 1 is an end view of a journal-box showing the lid in closed position. Fig. 2 is a sectional view on the line 2—2 of Fig. 1. Fig. 3 is a sectional view of the front end of the box and lid, taken substantially on the line 3—3 of Fig. 1. Fig. 3ª is an enlarged fragmentary section taken substantially on the line 3ª—3ª of Fig. 2. Fig. 4 is a fragmentary sectional elevation on the line 4—4 of Fig. 3, the locking pawl or detent being shown in dotted lines. Fig. 5 is a detached perspective view of the locking pawl or detent. Fig. 6 is a detached perspective view of an insert for forming the rib or flange on the box with which the locking pawl or detent coöperates. Fig. 7 is a view substantially similar to Fig. 2 of a modified form of catch embodying my invention. Fig. 8 is an enlarged perspective view of the locking pawl or detent; and Fig. 9 is an enlarged perspective view of the bracket against which the spring applied to the locking catch reacts.

Referring now to Figs. 1 to 6, inclusive, of the drawings, 1 designates the body portion of the journal box provided with an opening 2 in its outer end, 4 the lid or cover of the journal box pivoted to the body portion of the box at the upper side of the opening 2 therein in any usual or desired manner, 5 a leaf spring secured to the inner face of the lid or cover 4 and adapted to coöperate with flattened surfaces 6 on the bearing lug 7 of the journal box to maintain the lid 4 yieldingly in both closed and opened positions. As regards their general features, all of the foregoing parts are old and well known in the art and may be of any desired or approved construction. The lid or cover 4 is adapted to be secured in closed position by a pivoted pawl or detent 8 normally maintained yieldingly in locking position by means of a suitable spring applied thereto. As shown, the locking pawl or detent 8 is pivoted in a recess 9 in the lid or cover 4 by means of trunnions 10 thereon adapted to engage bearings formed on the sides of the recess 9, as shown, between shoulders 11 on the outer wall of said recess and inwardly projecting ribs 12 on the side walls of said recess. As shown, also, the bearings for said locking pawl or detent are open at their tops to provide for engaging the trunnions 10 thereon with said bearings. As shown, the spring for normally maintaining the locking pawl or detent 8 yieldingly in locking position consists of a downward extension 13 of the leaf spring 5, the lower end of which engages a slot or groove 14 formed transversely in the upper side of said pawl or detent. In order that the sides of the slot or groove 14 may not bind upon the end of the spring 13, said slot or groove is preferably enlarged within the open side thereof and the edges thereof are rounded. The locking pawl or detent 8 is adapted to coöperate with a rib or flange 15 formed on the body portion of the box at the lower side of the opening 2, the sides of said rib preferably converging upwardly toward the center line of said rib or flange. Pivotal movement of the locking pawl or detent 8 under the influence of the spring 13 applied thereto is limited by suitable stops, the relation being such that when said pawl or detent is disengaged and the cover raised, said stops will support said pawl in position to engage the rib or flange 15 when the lid or cover is closed. As shown, said stops consist of lugs 16 on the trunnions 10, which coöperate with the inwardly projecting ribs 12 on the side walls of the recess 9 in the lid or cover 4.

In practice, journal boxes are very commonly made of malleable iron. It is obvious, however, that a malleable iron rib or flange 15 would be objectionable on account of its softness as it would soon wear in use to such an extent that it would not afford proper engagement of the locking pawl or detent 8 with the body portion of the box. To avoid this objectionable result, the rib or flange 15 is preferably made in the form of a separate insert of non-annealable metal embedded in the wall of the body portion of the journal box 1, so that the upper edge thereof will project in proper position for engagement by the locking pawl or detent 8. Where the body portion 1 of the journal box is made of gray iron or other chilling metal, said rib or flange may be cast integral therewith and chilled.

The seat for the lid or cover 4 on the body portion 1 of the journal box preferably comprises a section 17 at its outer margin which is inclined or beveled relatively to the straight face of the end of the box. Obviously, the inclined section of the seat for the lid or cover will operate to centralize said lid or cover relatively to the journal box when said lid or cover is closed, and under the tension of the locking pawl or detent 8 will operate to maintain a tight, dust-proof joint between said journal box and lid. Proper adjustment of the lid or cover to its seat on the body portion 1 of the box will thus be assured, whereby a dust-proof joint will be produced and maintained at all times.

In Figs. 7, 8 and 9 of the drawings, I have shown a modified form of my invention as it relates to the lock mechanism. Excepting as hereinafter particularly described, the construction of said modified form of journal box is substantially identical with the form shown in Figs. 1 to 6, inclusive, and heretofore described, and will be readily understood without a description thereof in detail. Referring to said Figs. 7, 8 and 9, $1^1$ designates the body portion of the journal box, $4^1$ the lid or cover therefor, $8^1$ the locking pawl or detent pivoted in a recess $9^1$ in the lid or cover $4^1$ by means of trunnions $10^1$ which engage suitable bearings formed at the sides of said recess $9^1$ between the outer wall of said recess and inwardly projecting ribs $12^1$ on the side walls of said recess; and $15^1$ designates the rib or flange with which the locking pawl or detent $8^1$ coöperates to secure the lid or cover $4^1$ in closed position, said rib or flange being shown integral with the body portion $1^1$ of said journal box in said modified construction. Also, as in the form of the invention heretofore described, the seat or cover for the lid $4^1$ comprises an inclined or beveled section $17^1$ which coöperates with the locking pawl or detent $8^1$ to properly seat the lid or cover upon the open end of the box and to maintain a tight, dust-proof joint around said cover. The locking pawl or detent $8^1$ is normally maintained yieldingly in locking position by means of a coiled spring 18 inserted between a suitable seat 19 formed on said pawl and a bracket 20 secured in rigid position to the inner side of the lid or cover $4^1$. For reasons presently apparent, the spring seat 19 on the locking pawl or detent $8^1$ is wider than said pawl or detent, thus forming flanges 21 projecting laterally at both sides thereof. The bracket 20 is preferably formed with depending sides 22 which form a housing for the pawl $8^1$ and spring 18, the lateral sides 22 of said housing being extended over the trunnions $10^1$ on said locking pawl so as to secure said pintles in engagement with the bearings on the lid or cover $4^1$. Pivotal movement of the locking pawl or detent $8^1$ under the influence of the spring 18 is limited by suitable stops consisting, as shown, of ribs or flanges 23 which project inwardly from the lateral sides of the housing 22 in position to engage the projecting flanges 21 on said locking pawl or detent.

I claim:—

1. The combination in a journal box comprising a lid adapted for closing the open end thereof, of a spring lock for securing said lid in closed position, said lock comprising a detent pivotally mounted on said lid, a rib or flange on the body portion of the journal box adapted for engagement by said detent, said rib or flange consisting of an insert of non-annealable, hard material, and a spring applied to said detent adapted for maintaining the same yieldingly in locking position, substantially as described.

2. The combination in a journal box comprising a lid adapted for closing the open end thereof, of a spring lock for securing said lid in closed position, said lock comprising a detent pivotally mounted on said lid, a bracket on said lid and a spring inserted between said detent and bracket, substantially as described.

3. The combination in a journal box comprising a lid adapted for closing the open end thereof, of a spring lock for securing said lid in closed position, said lock comprising a detent pivotally mounted on said lid, a bracket on said lid and a spring inserted between said detent and bracket, said bracket comprising depending side walls and forming a housing for said detent and its spring, substantially as described.

4. The combination in a journal box comprising a lid adapted for closing the open end thereof, said lid being provided with a recess in its inner surface, of a spring lock for securing said lid in closed position, said lock comprising a detent pivotally mounted in the recess in said lid, a rib or flange on the body portion of the journal box adapted for engagement by said detent, and a spring applied to said detent for maintaining the same yieldingly in locking position, substantially as described.

5. The combination in a journal box comprising a lid adapted for closing the open end thereof, said lid being provided with a recess in its inner surface, of a spring lock for securing said lid in closed position, said lock comprising a detent, trunnions thereon which engage bearings formed on the side walls of the recess in said lid, a rib or flange on the body portion of the journal box adapted for engagement by said detent, and a spring applied to said detent for maintaining the same yieldingly in locking position, substantially as described.

6. The combination in a journal box comprising a lid adapted for closing the open end thereof, said lid being provided with a recess in its inner surface, of a spring lock for securing said lid in closed position, said lock comprising a detent, trunnions thereon which engage bearings on the side walls of the recess in said lid said bearing being formed in part by ribs projecting inwardly from said side walls, a rib or flange on the body portion of the journal box adapted for engagement by said detent, and a spring applied to said detent adapted for maintaining the same yieldingly in locking position, substantially as described.

7. The combination in a journal box comprising a lid adapted for closing the open end thereof, said lid being provided with a recess in its inner surface, of a spring lock for securing said lid in closed position, said lock comprising a detent, trunnions thereon which engage bearings on the side walls of the recess in said lid, a rib or flange on the body portion of the journal box adapted for engagement by said detent, a spring applied to said detent for maintaining the same yieldingly in locking position, and a stop adapted to limit the pivotal movement of said detent under the influence of said spring, substantially as described.

8. The combination in a journal box comprising a lid adapted for closing the open end thereof, said lid being provided with a recess in its inner surface, of a spring lock for securing said lid in closed position, said lock comprising a detent, trunnions thereon which engage bearings on the side walls of the recess in said lid formed in part by ribs projecting inwardly from said side walls, a rib or flange on the body portion of the journal box adapted for engagement by said detent, a bracket on said lid, a spring inserted between said detent and bracket, said bracket comprising depending side walls and forming a housing for said detent and its spring, and stops which limit the pivotal movement of said detent under the influence of said spring, said stops comprising opposed ribs or flanges formed on said detent and on the depending walls of said housing, substantially as described.

In testimony, that I claim the foregoing as my invention, I affix my signature in presence of two subscribing witnesses, this 10th day of November, A. D. 1909.

CHAS. W. BOOTH.

Witnesses:
K. A. COSTELLO,
M. W. COSTELLO.

---

Copies of this patent may be obtained for five cents each, by addressing the "Commissioner of Patents, Washington, D. C."